United States Patent [19]

Maruyama

[11] 4,329,093
[45] May 11, 1982

[54] DIE-HEAD OF CUTTING MACHINE

[76] Inventor: Masaaki Maruyama, 8-3, Koaza Sanbongi, Aza Inuidani, Seika-cho, Soraku-gun, Kyoto, Japan

[21] Appl. No.: 122,459

[22] Filed: Feb. 19, 1980

[30] Foreign Application Priority Data

Mar. 14, 1979 [JP] Japan .............................. 54-31635[U]

[51] Int. Cl.³ .............................................. B23G 5/12
[52] U.S. Cl. ...................................... 408/15; 10/96 R;
10/96 T; 10/120; 408/149; 408/177
[58] Field of Search ................. 10/87, 94, 96 R, 96 T, 10/120, 120.5 R, 120.5 AD; 408/12, 15, 73, 148, 149, 176, 177, 219, 221

[56] References Cited
U.S. PATENT DOCUMENTS

| 731,121 | 6/1903 | Nuttall | 408/177 X |
|---|---|---|---|
| 977,541 | 12/1910 | Oster | 408/176 |
| 1,176,812 | 3/1916 | Bradley | 408/177 |
| 1,527,185 | 2/1925 | Hall | 10/120.5 R |
| 1,701,846 | 2/1929 | Harrison | 10/96 R |
| 2,017,764 | 10/1935 | Mathias | 10/96 T |
| 2,549,543 | 4/1951 | Strickland | 408/148 |
| 3,142,076 | 7/1964 | Brandt | 408/176 X |
| 3,165,768 | 1/1965 | Herbkersman | 10/87 |
| 3,648,313 | 3/1972 | Fohl | 10/96 R |
| 3,820,180 | 6/1974 | Birkestrand et al. | 10/94 |
| 3,977,032 | 8/1976 | Newell et al. | 10/96 R |

Primary Examiner—Ervin M. Combs

[57] ABSTRACT

A die-head of a cutting machine comprising a pair of relatively rotatable annular plates which movably hold cutting tools therebetween, a tool retracting lever with a stop, pivotally connected to one of the annular plates, a slide integrally connected to the other annular plate and peripherally pressed by a spring, and a pivotable cam plate with a projection bearing against the stop, the slide having a groove into which is engaged the projection of the cam plate, whereby the displacement of the lever, resulting from the movement of a workpiece causes the cam plate to rotate, thus resulting in a rotation of the slide to automatically retract the cutting tools.

2 Claims, 7 Drawing Figures

DIE-HEAD OF CUTTING MACHINE

This invention relates to a cutting machine and, in particular, to a die-head thereof having an automatic tool retracting device for automatically retracting cutting tolls when the cutting operation is completed.

In conventional known cutting machines, such as a pipe thread cutter, an operator usually operates a die-head manually to withdraw the cutting tools provided on the die-head when the cutting operation is completed. However, in such a case, the operator must always stand by the machine to oversee the completion of the cutting. Furthermore, the pipe to be cut tends to be subject to scratches, such as the so-called "tool marks" on the thread formed on the pipe when the tools are retracted from the pipe, which in turn will cause a problem of leakage. In addition, since it is very difficult for an ordinary operator to cut a uniform length of threads on the pipes, a very highly skilled operator is required.

There has been proposed a die-head of a cutting machine in which cutting tools are automatically retracted when a desired cutting is completed (U.S. patent application Ser. No. 36809, which has been assigned to the same assignee as that of this application), in order to eliminate the above mentioned drawbacks.

The present invention is directed to an improvement of a die-head, as disclosed in the U.S. Ser. No. 36809, to increase the reliability of the operation thereof.

Another object of this invention is to provide a die-head of a cutting machine which can effect an additional taper threading, particularly in a taper cutting machine, such as a taper threading machine, by gradually retracting cutting tools at the completion of the cutting.

Such an additional taper threading is often required in practice for the following reason. That is, since the JIS (Japanese Industrial Standard) defines only the minimum number of screw threads for taper threads which are to be cut on connecting ends of pipes, such as water pipes or gas pipes, the actual number of the screw threads is often larger than the JIS's minimum number by a few screw threads. Furthermore, the additional number of screw threads varies in accordance with the requirements of pipe makers, the uses of the pipes, the places in which the pipes are used and the like.

The variation of the additional number of the screw threads requires the replacement of chasers (i.e. taper threading tools), which results in a decrease in the efficiency of the work and of the reliability of machine.

A die-head according to this invention can also decrease the above mentioned drawbacks.

The invention will be discussed below with reference to the accompanying drawings, illustrating preferred embodiments of the invention, in which.

Figure 1:
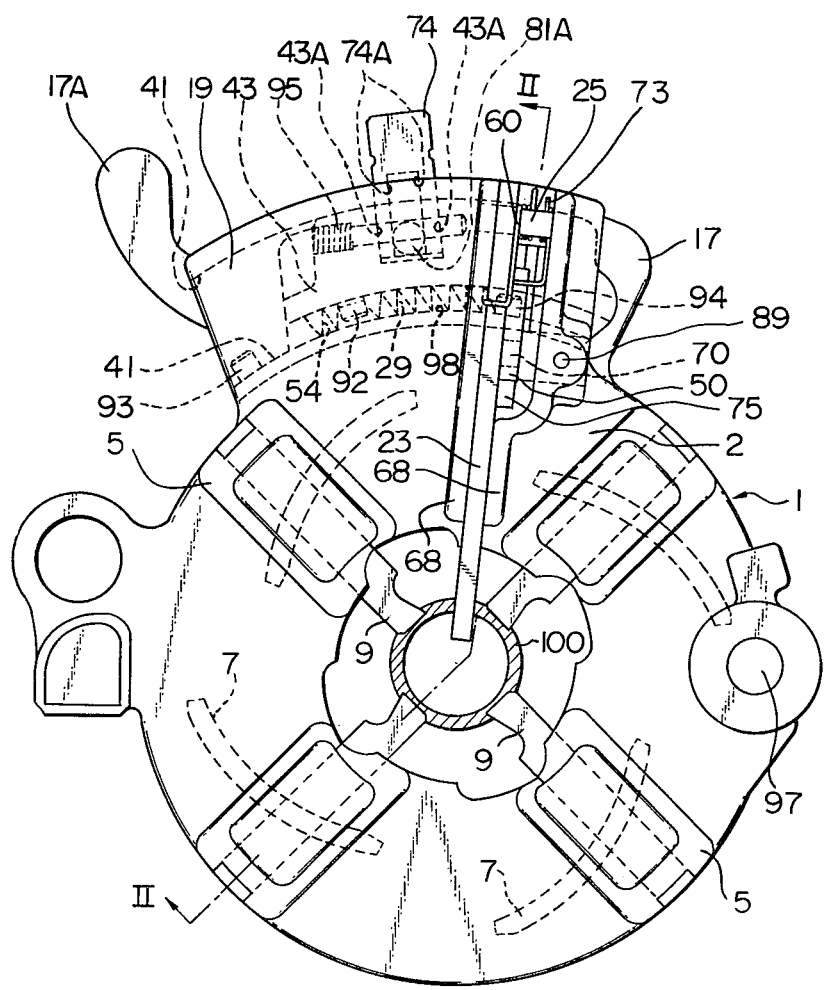
FIG. 1 is a front elevational view of a die-head having a tool retracting lever, according to the present invention.
Figure 3:
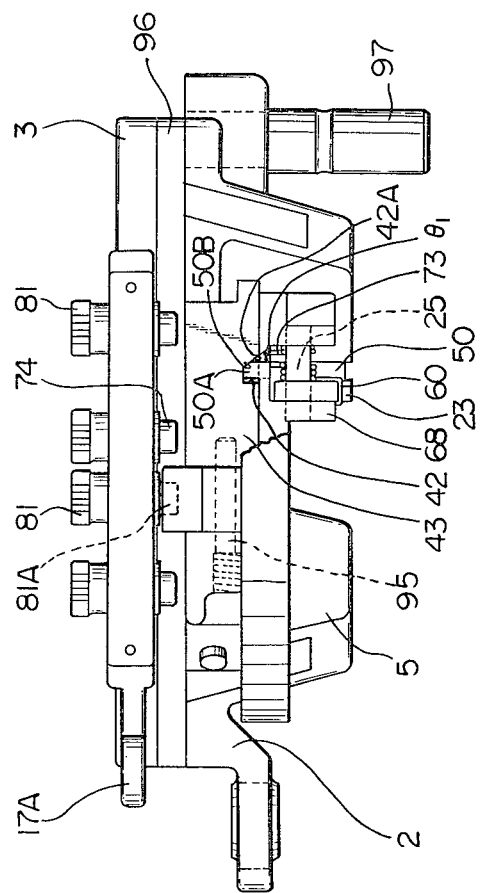
FIG. 3 is a plan view of FIG. 1.
Figure 4:
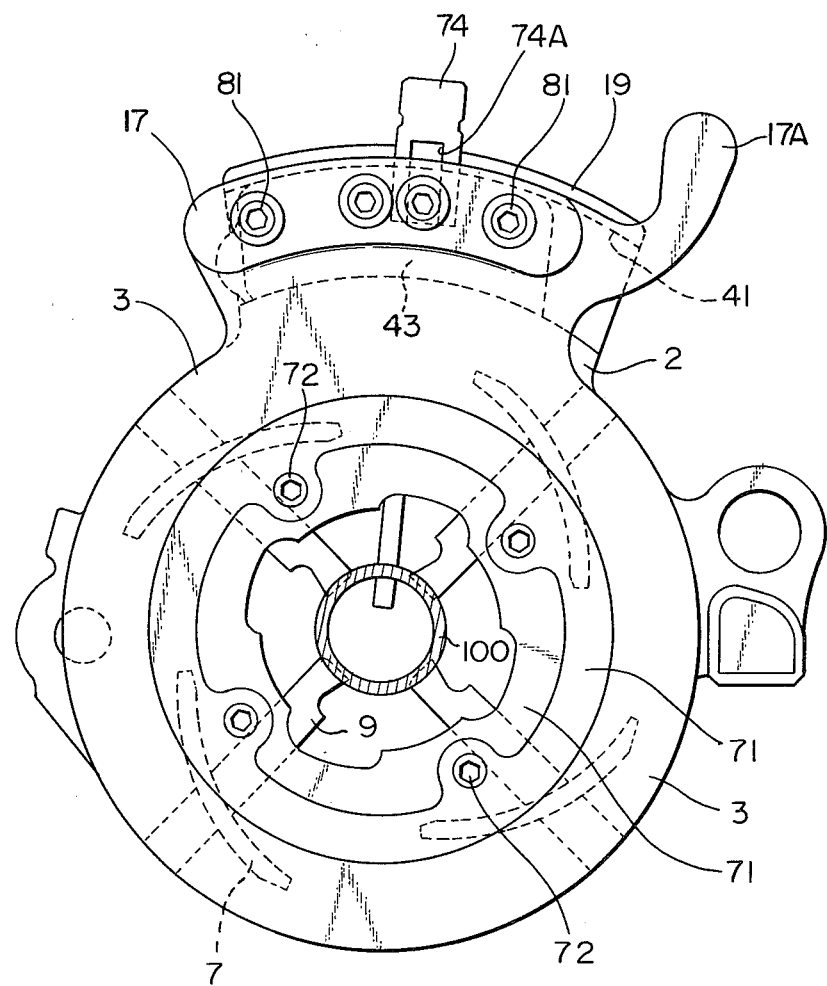
FIG. 4 is a back elevational view of FIG. 1.

FIG. 1 illustrates a die-head for supporting cutting tools, such as bit tools or chasers extending in radial directions. A die-head body 1 is supported on a carriage (not shown) of a cutting machine (not shown), by means of a mounting rod 97 (FIG. 3). The carriage is supported by and reciprocally moves along a pair of guide bars (not shown) which extend parallel to a workpiece 100 such as a pipe to be cut.

Figure 7:
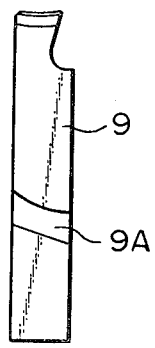
FIGS. 6 and 7 are an elevational view and a side elevational view of a chaser, respectively.
Figure 6:
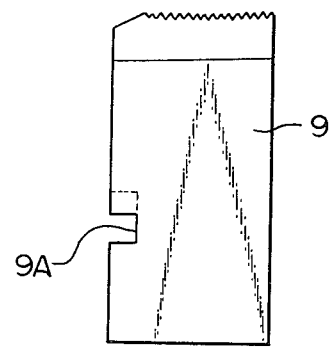

The die-head body 1 has a pair of substantially opposing annular plates 2 and 3 (FIGS. 2 and 3) which are rotatable relative to one another. The movable plate 3, has curved projections 7, the number of projections being equal to that of the cutting tools 9 (wherein the number of projections is four, as shown in the illustrated embodiment), and the other stationary plate 2 includes cutting tools 9 each having a curved groove 9A (FIGS. 6 and 7) corresponding to each of the curved projections 7. The cutting tools 9 are supported in supporting portions 5 which project outwardly from the outer surface of the plate 2. The cutting tools 9 can be radially displaced due to the engagement of the curved projections 7 and the corresponding curved grooves 9A when a relative rotation occurs between the two plates 2 and 3. Since the scroll mechanism used for radially displacing the above-mentioned cutting tools is well known in the conventional cutting machine, accordingly no additional explanation for the mechanism is given herein.

The radial position of the cutting tools 9 can be set by the rotation of the plate 3 relative to the plate 2.

The plate 2 has a holding portion 19 which projects out from the periphery of the plate 2 and which has an inner peripheral curved channel 41 in which a slide 43 is slidably fitted. The slide 43 slides in the curved channel 41 so as to move on the periphery of the plate 2.

The slide 43 is spring-biased in a peripheral direction (in the counterclockwise direction of FIG. 1) by a spring 29 which is arranged in a recess 98 formed in the slide 43, between a pin 94 secured to e.g., the plate 2 and a pin 92 of the slide 43. That is, a rotation force in the counterclockwise direction of FIG. 1 is provided to the slide 43 by means of the spring 29.

The tool retracting lever 23 is pivoted to the plate 2 by means of a pivot pin 25 so that it can rotate about the pivot pin 25. A return spring 60 is provided between the lever 23 and the plate 2 to bias the lever 23 always in the counterclockwise direction of FIG. 2 and to maintain the lever at an initial position designated by a solid line in FIG. 2. The return spring 60 bears, at its one end, against the holding portion 19 of the plate 2 and at the other end against the lever 23. The spring 60 is arranged around the pivot pin 25.

The plate 3 is rotatably held by an inner ring plate 71 which is secured to the plate 2, for example, by means of set screws 72. That is, the plate 3 can rotate between the plate 2 and the shoulder 71A (FIG. 2) of the ring plate 71.

Between the plates 2 and 3 is also provided a ring plate 96 (FIGS. 2 and 3) which is secured to the plate 2 by means of set screws 99 to hold the tools 9 in the supporting portions 5 of the plate 2.

To the ledge 17 of the plate 3 are detachably mounted, for example, four positioning pins 81. The number of the pins 81 is, however, not limited to four and may be more or less than four. The number of the pins 81 corresponds to the number of kinds of the screw threads on the pipe 100 having different diameters of the threads. The slide 43 has an upper U-shaped groove 43A in which is rotatably fitted a positioning lever 74, by means of a threaded pin 95. That is, the threaded pin 95 is secured to the slide 43 so as to cross the groove 43A, so that the positioning lever 74 can rotate about the pin 95, in a counterclockwise direction in FIG. 2. The lever 74 is provided, on its rear face, with an inclined groove 74A (FIGS. 1 and 2) in which any one of the pins 81 is selectively fitted. That is, when the lever 74 is rotated about the pin 95 in a counterclockwise direction from a position illustrated in FIG. 2, the front end 81A of the pin 81 that has been fitted in the inclined groove 74A of the lever 74 comes out of the inclined groove 74A, so that the plate 3 which has been integrally connected to the slide 43 by the engagement of the front end 81A of the pin 81 and the inclined groove 74A can be separated from and become free from the slide 43, thus resulting in allowing the plate 3 to be manually rotated with respect to the plate 2. The plate 3 can be easily rotated by a handle 17A of the ledge 17 to selectively bring a desired pin 81 into a set position in which the front end 81A of the desired pin 81 faces the lever 74. The plate 3 and the slide 43 can rotate together with respect to the plate 2 when the front end 81A of any one of the pins 81 is engaged in the inclined groove 74A. It will be appreciated that the provision of the inclined groove 74A makes it possible to rotate the lever 74 about the pin 95 without withdrawing the front end 81A of the pin 81 from the inclined groove 74A.

To the pin 92 is secured one end of a damper spring 54 which strikes, at its free end, against a stop pin 93 secured to the plate 2 in order to absorb a shock which occures when a cam plate 50 is disengaged from a recessed groove 42 (FIGS. 2 and 3) of the slide 43 so that the slide 43 is moved by the spring 29, as will be discussed hereinafter.

Figure 2:
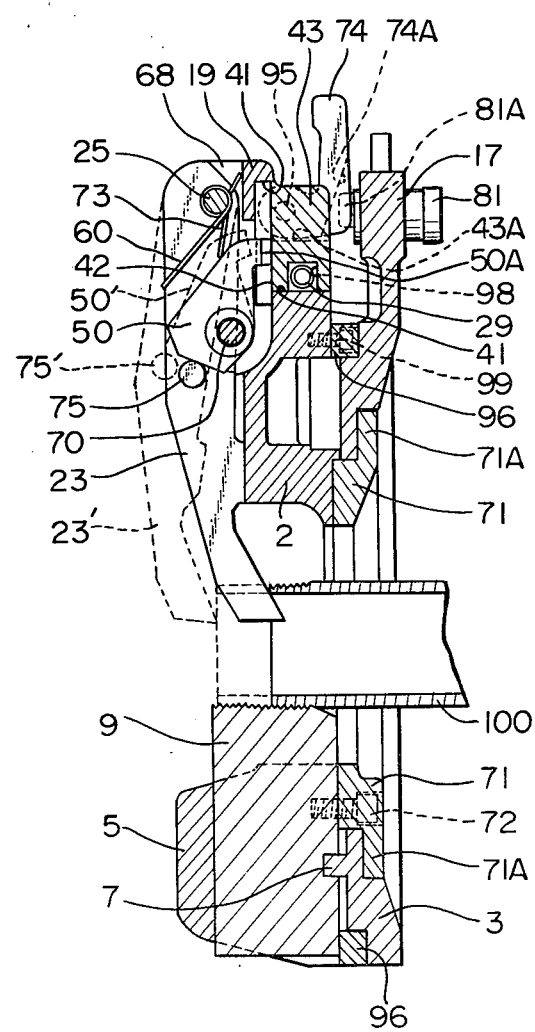
FIG. 2 is a sectional view taken along the line II—II of FIG. 1.

As mentioned above, the lever 23 is pivotally connected, at its upper end, to the pivot pin 25 so as to rotate about the latter. The pin 25 is secured to a fork member 68 integral with the plate 2. To the fork member 68 is also attached a stepped pivot pin 70, to which the cam plate 50 is pivotally connected. A pin 89 is provided to secure the pin 70 to the fork member 68. The cam plate 50 can rotate about the pin 70. The cam plate 50 has a projection 50A engaged in the groove 42 of the slide 43 and is always biased in one direction by a coil spring 73 which is weaker than the spring 29 and which is provided around the pin 25. That is, the rotational force in the clockwise direction of FIG. 2 is always applied to the cam plate 50 by means of the spring 73 which bears against the holding portion 19 of the plate 2 at its one end and against the cam plate 50 at the other end.

The recessed groove 42 has an inclined face 42A (FIG. 3) on which is located a corresponding inclined face 50B provided on the projection 50A of the cam plate 50. Therefore, when a force is applied to the slide 43 in a left hand direction in FIG. 3, by the spring 29, the projection 50A is moved downward in FIG. 3 by a component of the force in the downward direction in FIG. 3, due to the presence of the inclined faces 42A and 50B. That is, since the spring 29 is rather stronger than the spring 73, the projection 50A tends to come out from the recessed groove 42 under the influence of the above mentioned component of the force. In order to prevent the projection 50A from coming out of the recessed groove 42, a stop pin 75 which bears against the underside of the cam plate 50 is provided on the lever 23 to limit the rotational movement of the cam plate 50 in the counterclockwise direction of FIG. 2. Therefore, the cam plate 50 can rotate only when the displacement of the stop pin 75 occurs.

The inclined face 42A is also adapted to cut a taper thread on the pipe 100. The method for cutting a taper thread will be described hereinafter.

The lower free end of the lever 23 protrudes into the center opening of the annular plates 2 and 3 so as to be in contact with the pipe 100.

When the cutting operation approaches completion, the front end of the pipe 100 is brought into contact with the free end of the lever 23 and begins to gradually push the lever 23 in the left hand direction of FIG. 2, so that the lever 23 is caused to rotate about the pivot pin 25 in a clockwise direction of FIG. 2.

The rotation of the lever 23 causes the stop pin 75 on the lever 23 to effect a circular motion about the pin 25 so that the pin 75 comes to a position 75' designated by a dotted line (FIG. 2). As a result, the cam plate 50, which is always subject to a rotational force in counterclockwise direction by the slide 43, as mentioned above, is rotated to position 50', designated by dotted lines, about the pin 70, since the stop pin 75 is now separated from the cam plate 50. When the slide 43 begins to move in a peripheral direction while moving the cam plate 50, the projection 50A of the cam plate 50 is gradually disengaged from the recessed groove 42 of the slide 43.

That is, since the slide 43 is always pressed in the peripheral direction by the spring 29, when the lever 23 is gradually rotated by the movement of the pipe 100, the slide 43 gradually moves and, accordingly, the plate 3 is gradually rotated, due to the presence of the inclined face 50B of the projection 50A. As a result, the cutting tools 9 are gradually retracted, thus resulting in the formation of a tapered thread on the pipe 100.

It should be noted here that the slide 43 is subject to not only the spring force of the spring 29 but also a cutting torque which occurs when the tools 9 cut the pipe 100.

By a further movement of the pipe 100, the lever 23 is brought into a position 23' and the cam plate 50 is brought into a position 50'. As a result, the projection 50A of the cam plate 50 is completely disengaged from the groove 42. At this moment, the slide 43 is suddenly and substantially moved in the left hand direction in FIG. 1, by the spring 29, so that the plate 3 which is connected to the slide 43 by means of the pin 81 and the lever 74 is also rotate relative to the plate 2, thus resulting in a quick retraction of the cutting tools 9. At this stage, the cutting operation is completed. The cutting tools can thus be attomatically retracted to their non-working positions, as soon as the cutting of the pipe is completed.

The gradual and automatic retraction of the cutting tools at the completion of the cutting operation contributes to the solution of the problem of the "tool-mark" mentioned above.

Figure 5:
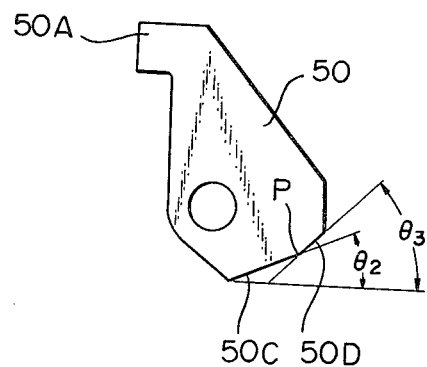
FIG. 5 is an elevational view of a cam plate.

The cam plate 50 is preferably provided with two kinds of inclined cam surface portions 50C and 50D, which bear against the stop pin 75 (FIG. 2), as shown in FIG. 5. In FIG. 5, $\theta_3$ is larger than $\theta_2$ and a point P designates the boundary between $\theta_2$ and $\theta_3$. The tapered thread cutting or additional taper threading is effected until the contact point between the cam plate 50 and the stop pin 75 (FIG. 2) reaches a point P, at which the angle is changed from $\theta_2$ to $\theta_3$, and the quick retraction of the cutting tools 9 is effected when the contact point passes the point P. The length and the angle of the tapered thread to be cut on the pipe 100 can be optionally adjusted by changing angle $\theta_1$ (FIG. 3) of the inclined face 42A of the groove 42 and of the inclined face 50B of the projection 50A, and the angles $\theta_2$ and $\theta_3$ (FIG. 5) of the cam plate 50.

Since the projection 50A which is to be engaged in the groove 42 of the slide 43 is provided on the cam plate 50 interposed between the lever 23 and the groove 42, instead of directly on the lever 23 (U.S. Ser. No. 36809 discloses a direct provision of the projection on the lever), the rotation of the lever 23 is converted to the rotation of the cam plate 50, so that the slide movement of the slide 43 can be smoothly effected, thus resulting in an improvement of the appearance of the cut surface of the pipe.

The workpiece to be cut is not limited to a pipe, but may be any kind of rod or bar material.

The cutting is not limited to thread cutting, but includes various kinds of machining, such a taper cutting or chamfering.

The length of the thread to be cut on the workpiece is substantially uniform, independently of the skill of the operators, unlike the prior art cutting machine.

What is claimed is:

1. A die-head of a cutting machine comprising a pair of relatively rotatable annular plates which movably hold cutting tools therebetween, so that said cutting tools can be radially displaced by the relative rotation of said annular plates, a tool retracting lever with a stop, said lever projecting at one end thereof into a center opening of said annular plates, for engagement with a free end of a workpiece said lever being pivotally connected to one of said annular plates with a return spring being provided between said lever and said one annular plate, a slide which is integrally connected to the other annular plate so as to move therewith and which is always pressed in a peripheral direction of said annular plates by a spring arranged between said slide and said one annular plate, said slide being mounted to said one annular plate, and a cam plate with a projection which bears against said stop, said cam plate being pivotally mounted to said one annular plate, said slide being provided with a recessed groove which receives said projection of said cam plate therein, whereby the displacement of said tool retracting lever, which occurs when said tool retracting lever is pushed and pivoted by a free end of a workpiece moving through said center opening, causes said cam plate to rotate in order to disengage the projection of said cam plate from said recessed groove of said slide, thus resulting in a rotation of the slide together with said other annular plate to automatically retract said cutting tools.

2. A die-head according to claim 1, wherein said cam plate comprises two inclined cam surfaces having different inclinations, against which said stop on the tool retraction lever bears.

* * * * *